(12) United States Patent
Baldwin et al.

(10) Patent No.: US 8,159,794 B2
(45) Date of Patent: Apr. 17, 2012

(54) SELF TESTING GROUND FAULT CIRCUIT INTERRUPTER (GFCI) WITH END OF LIFE (EOL) DETECTION THAT REJECTS FALSE EOL INFORMATION

(75) Inventors: John R. Baldwin, Newtown, CT (US); Robert Fanzutti, Naugatuck, CT (US); Daming Yu, Easton, CT (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 12/801,269

(22) Filed: Jun. 1, 2010

(65) Prior Publication Data

US 2010/0238597 A1    Sep. 23, 2010

Related U.S. Application Data

(63) Continuation of application No. 11/497,515, filed on Aug. 2, 2006, now Pat. No. 7,791,848.

(60) Provisional application No. 60/706,035, filed on Aug. 8, 2005.

(51) Int. Cl.
*H02H 9/08*      (2006.01)
(52) U.S. Cl. .......................................................... 361/42
(58) Field of Classification Search ..................... 361/42
See application file for complete search history.

(56) References Cited

U.S. PATENT DOCUMENTS

| | | | | | |
|---|---|---|---|---|---|
| 5,243,291 | A | * | 9/1993 | Umemura | 324/418 |
| 5,455,733 | A | * | 10/1995 | Waggamon | 361/115 |
| 5,834,940 | A | * | 11/1998 | Brooks et al. | 324/424 |
| 6,262,871 | B1 | * | 7/2001 | Nemir et al. | 361/42 |
| 6,674,289 | B2 | * | 1/2004 | Macbeth | 324/509 |
| 6,873,158 | B2 | * | 3/2005 | Macbeth | 324/509 |
| 6,980,005 | B2 | * | 12/2005 | Finlay et al. | 324/424 |
| 7,196,885 | B2 | * | 3/2007 | Pierce et al. | 361/42 |
| 2002/0181175 | A1 | * | 12/2002 | Baldwin | 361/42 |
| 2004/0037018 | A1 | * | 2/2004 | Kim | 361/42 |

* cited by examiner

*Primary Examiner* — Jared Fureman
*Assistant Examiner* — Scott Bauer
(74) *Attorney, Agent, or Firm* — Kevin M. Barner; Mark S. Bicks; Alfred N. Goodman (57) ABSTRACT

A self test (ST) ground fault circuit interrupter (GFCI) provides improved end of life (EOL) detection by rejecting false EOL information. A processing device receives fault detection signals indicating when faults are detected, and input signals indicating when contacts used to interrupt power to a load are closed. The processing device rejects the fault detection signals when they fail to meet a selected condition and the contacts are closed, and declares end of life (EOL) when the selected condition is met. The fault detection signals can correspond to pulses at an output of a gated device between the processing device and a GFCI chip, and the selected condition can be a selected integer number of pulses.

26 Claims, 6 Drawing Sheets

☐ = SERIAL PROGRAMMING CONNECTIONS

SELF TESTING GROUND FAULT CIRCUIT INTERRUPTER (GFCI) WITH END OF LIFE (EOL) DETECTION THAT REJECTS FALSE EOL INFORMATION

CROSS-REFERENCE TO RELATED APPLICATIONS

This application is a continuation of U.S. application Ser. No. 11/497,515 filed Aug. 2, 2006, now U.S. Pat. No. 7,791,848 which claims the benefit under 35 U.S.C. §119(e) of U.S. Provisional Application No. 60/706,035 filed Aug. 8, 2005, entitled "SELF TESTING GROUND FAULT CIRCUIT INTERRUPTER (GFCI) WITH END OF LIFE (EOL) DETECTION THAT REJECTS FALSE EOL INFORMATION," the entire disclosures of the above-identified provisional and non-provisional applications are hereby incorporated by reference herein for all that is taught.

Related subject matter is disclosed in U.S. Non-provisional application Ser. No. 11/000,531 filed Dec. 16, 2004, entitled "SELF TESTING GROUND FAULT CIRCUIT INTERRUPTER (GFCI)", U.S. Non-provisional application Ser. No. 11/198,400 filed Aug. 8, 2005, entitled "SELF TESTING GROUND FAULT CIRCUIT INTERRUPTER (GFCI) WITH END OF LIFE (EOL) DETECTION THAT REJECTS FALSE EOL INFORMATION", and U.S. Non-provisional application Ser. No. 11/198,388 filed Aug. 8, 2005, entitled "GROUND FAULT CIRCUIT INTERRUPTER (GFCI) END-OF-LIFE (EOL) STATUS INDICATOR", the entire contents of said applications being incorporated herein by reference.

FIELD OF THE INVENTION

The present invention relates generally to a self testing fault interrupting device, such as a ground fault circuit interrupter (GFCI). More particularly, the present invention relates to a self testing fault interrupting device having improved EOL detection that is capable of rejecting false EOL information.

BACKGROUND OF THE INVENTION

GFCI devices are designed to trip in response to the detection of a ground fault condition at an AC load. Generally, the ground fault condition results when a person or object comes into contact with the line side of the AC load and an earth ground at the same time, a situation which can result in serious injury. The GFCI device detects this condition by using a sensing transformer to detect an imbalance between the currents flowing in the line and neutral conductors of the AC supply, as will occur when some of the current on the line side is being diverted to ground. When such an imbalance is detected, an electrically-held relay having primary power contacts within the GFCI device is immediately denergized to place the primary power contacts in an open condition, thereby opening both sides of the AC line and removing all power from the load. Many types of GFCI devices are capable of being tripped not only by contact between the line side of the AC load and ground, but also by a connection between the neutral side of the AC load and ground. The latter type of connection, which may result from a defective load or from improper wiring, is potentially dangerous because it can prevent a conventional GFCI device from tripping at the intended threshold level of differing current between line and neutral when a line-to-ground fault occurs.

GFCI devices may be connected to fuse boxes or circuit breaker panels to provide central protection for the AC wiring throughout a commercial or residential structure. More commonly, however, GFCI devices are incorporated into electrical receptacles that are designed for installation at various locations within a building. A typical receptacle configuration is shown, for example, in U.S. Pat. No. 4,568,997, to Bienwald et al., the entire content of which is incorporated herein by reference. This type of receptacle includes test and reset pushbuttons and a lamp or light-emitting diode (LED) which indicates that the circuit is operating normally. When a ground fault occurs in the protected circuit, or when the test button is depressed, the GFCI device trips and an internal circuit breaker opens both sides of the AC line. The tripping of the circuit breaker causes the reset button to pop out and the LED to be extinguished, providing a visual indication that a ground fault has occurred. In order to reset the GFCI device, the reset button is depressed in order to close and latch the circuit breaker, and this also causes the LED to illuminate once again.

Ground fault protection from miswiring is also provided. Specifically, GFCI receptacles of the type described above may be erroneously connected with the incoming AC source conductors being tied directly to the load or feedthrough terminals of the receptacle rather than to the source terminals. Because of the nature of the internal wiring of the GFCI receptacle, this miswiring condition is not easily detected. AC power will still be present at the receptacle outlets, making it appear that the receptacle is operating normally. If the test push button is depressed, the latching mechanism within the GFCI receptacle will be released and the reset push button will pop out, again making it appear that the GFCI receptacle is operating normally and providing the desired ground fault protection. In reality, however, no such protection is being provided because the AC source has been wired directly to the receptacle outlets without passing through the internal circuit breaker of the GFCI device.

Furthermore, a user may not know the state the GFCI is in without having to operate the test and reset buttons. Therefore, a visual indication should be provided to indicate to a user the different states the GFCI is in.

As a GFCI device is repeatedly tested or is frequently interrupting the power-supply circuit, its primary contacts begin to wear and, over time, the primary contacts do not have sufficient area or contact pad left to effectively withstand the severe electrical consequences of interrupting an energized circuit, in particular, arcing. When the GFCI device primary contacts are at the end of their useful life, one of several possible failures is the welding together of the primary contacts. In this failure condition, the electrical power circuit to the load is not interrupted even though the GFCI circuit signaled that a fault has occurred and the circuit responded as designed (i.e., operated in a manner that would have normally opened the primary contacts), which normally would interrupt the electrical power circuit to the load. This is a potentially hazardous condition because the conventional GFCI device has signaled a fault, but the appliance or tool that may be causing the fault is still connected to a power supply. It is also possible that the conventional GCFI circuit would indicate that no fault has occurred, which would potentially harm a user through continued use of an appliance or tool that is in an unsafe condition.

Many GFCI devices employ a GFCI integrated circuit or chip in the sensing circuit that processes data received from the sensing transformers and provides an output or trip signal that can be used to activate a gated device such as an SCR and energize a solenoid and open the contacts. A microprocessor, in turn, monitors outputs from the GFCI chip and SCR, among other components. When ground fault (GF) current levels vary around the GFCI GF current threshold, intermittent GFCI chip outputs can occur. These intermittent outputs may have sufficient energy to turn the SCR on and, at the same time, result in insufficient energy in the solenoid coil to open the contacts. Thus, it is possible for the microprocessor to make a false EOL determination.

A need therefore exists for a GFCI device that can discriminate against intermittent GFCI chip output signals caused by GF current levels varying near the GFCI GF current threshold and thereby avoid a false or premature EOL determination.

SUMMARY OF THE INVENTION

The above disadvantages and other objectives are substantially achieved by a system and method employing a ground fault circuit interrupter (GFCI) in accordance with the principles of the present invention. The method and GFCI comprises an indicator circuit that provides an indication that the GFCI has reached the end of its useful life, and a programmed microcontroller for monitoring the behavior of the SCR and the contacts to determine when the GFCI no longer can open contacts in response to solenoid energization (e.g., the solenoid is capable of being energized but its plunger is stuck and cannot open the contacts).

In accordance with an exemplary embodiment of the present invention, a method for operating a ground fault circuit interrupter (GFCI) comprises receiving fault detection signals indicating when faults are detected; receiving input signals indicating when contacts used to interrupt power to a load are closed; and determining the fault detection signals to be false when they fail to meet a selected condition and the contacts are closed, and declaring end of life (EOL) when the fault detection signals meet the selected condition and the contacts are closed.

In accordance with an exemplary embodiment of the present invention, the determining step comprises rejecting the fault detection signals until a selected number of fault detection signals occur while the contacts are closed, and then declaring EOL.

In accordance with an exemplary embodiment of the present invention, the determination of whether the selected condition is met while the GFCI is undergoing a self-test is deferred until after the self-test is performed.

In accordance with an exemplary embodiment of the present invention, one of the fault detection signals is from a gated device connected between a GFCI chip and a processing device. The gated device is turned on by the output signals from a GFCI chip when ground fault current levels in the GFCI exceed a ground fault current threshold for the GFCI chip. The selected condition is the GFCI chip turning on the gated device a selected number of times. The output of the gated device is monitored to determine whether the selected condition is met.

In accordance with an exemplary embodiment of the present invention, the gated device is a silicon-controlled rectifier (SCR).

In one exemplary embodiment of the present invention, the microprocessor monitors the pulses in the positive half sinusoid at the SCR gate and declares EOL after a selected number of pulses occurs while the contacts remain closed.

In another exemplary embodiment of the present invention, the microprocessor monitors the pulses in the positive half sinusoid at the SCR anode and declares EOL after a selected number of pulses occurs while the contacts remain closed.

In yet other exemplary embodiments of the present invention, the microprocessor monitors the pulses in the positive half sinusoid at both the SCR anode and gate and declares EOL after a selected number of pulses occurs at one or both while the contacts remain closed, or a selected number of pulses occurs at one of the anode and the gate of the SCR before the other before EOL is declared.

In accordance with another exemplary embodiment of the present invention, a fault detector comprises: line side terminals for receiving an input power signal; load side terminals for connecting to a load; hot and neutral conductors for connecting respective line side terminals to corresponding load side terminals; a ground fault circuit interrupter (GFCI) device for detecting faults and controllably operating at least one switching device to open at least one of the hot and neutral conductors upon detection of a fault; a gated semiconductor device operable to conduct in response to a selected output of the GFCI device; and a processing device adapted to receive output signals from the gated semiconductor device and programmed to monitor the output signals and to declare end of life of the fault detector when the output signals meet a selected condition while the switching device is closed. An end of life (EOL) indicator can also be provided that is controllably operated by the processing device to indicate end of life of the fault detector.

In accordance with another exemplary embodiment of the present invention, the selected condition is the GFCI device turning on the gated semiconductor device a selected number of times. The processing device monitors the output of the gated device to determine whether the selected condition is met.

In accordance with other exemplary embodiments of the present invention, the gated semiconductor device is a silicon-controlled rectifier (SCR). The output signals can comprise pulses, and the processing device can monitor the output of the SCR to count the pulses. The pulses can be counted during the positive half-cycle of an AC power signal provided to the fault detector.

In accordance with another exemplary embodiment of the present invention, the output signals comprise pulses generated in response to the GFCI device detecting a fault, and the selected condition is a selected number of the pulses received by the processing device.

In accordance with another exemplary embodiment of the present invention, the GFCI device has a ground fault current threshold and generates intermittent signals that have sufficient energy to turn on gated semiconductor device and insufficient energy to activate the switching device. The output signals comprise pulses corresponding to when the intermittent signals turn on the gated semiconductor device.

BRIEF DESCRIPTION OF THE DRAWINGS

These and other aspects, advantages and novel features of the invention will be more readily appreciated from the following detailed description when read in conjunction with the accompanying drawings, in which.

Throughout the claims, like reference numbers should be understood to refer to like elements, features and structures.

DETAILED DESCRIPTION OF THE EXEMPLARY EMBODIMENTS

Figure 1:
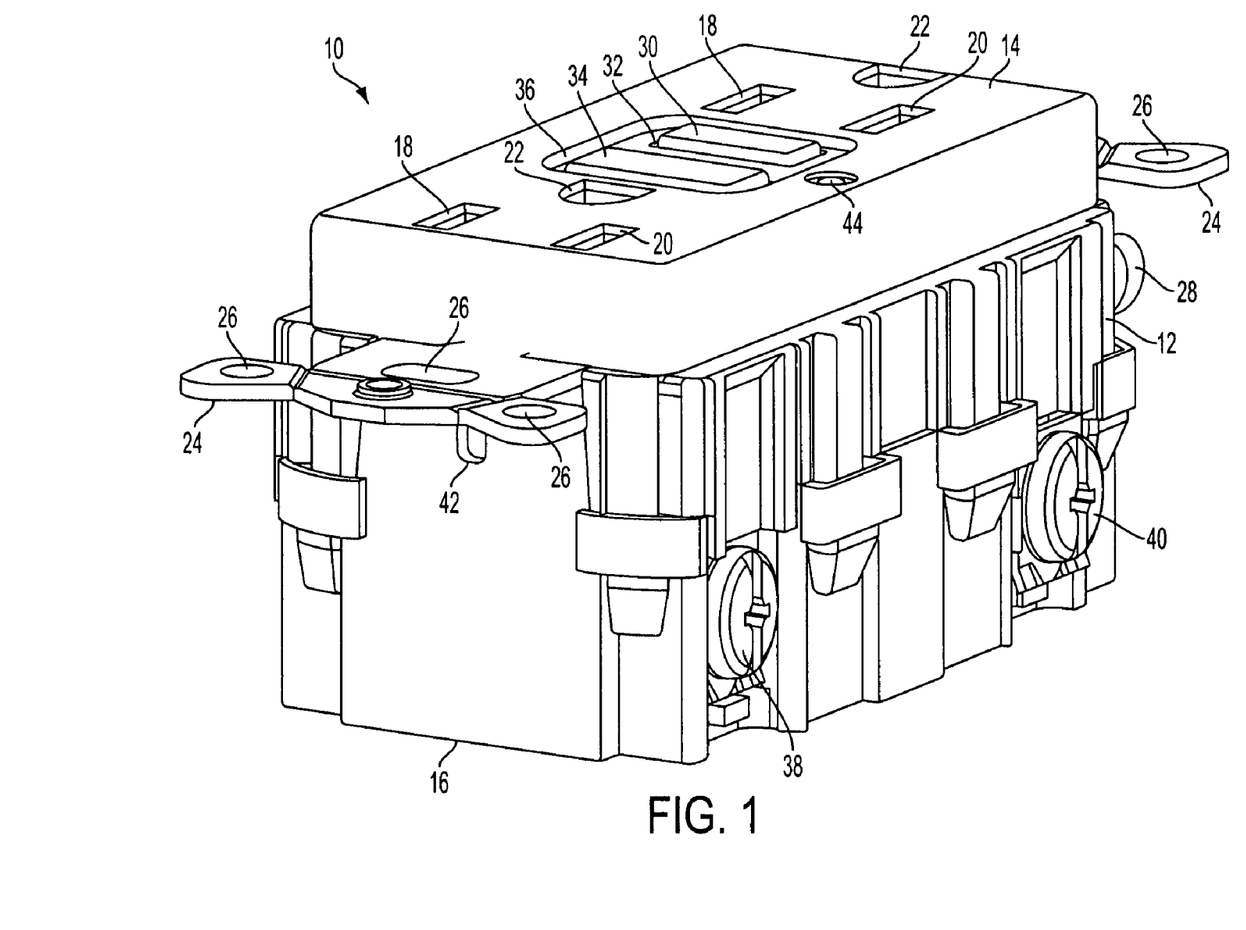
FIG. 1 is a perspective view of an example of a ground fault circuit interrupting (GFCI) device in accordance with an exemplary embodiment of the present invention.

FIG. 1 is a perspective view of an example of a ground fault circuit interrupting (GFCI) device 10 in accordance with an embodiment of the present invention. The GFCI device 10 comprises a housing 12 having a cover portion 14 and a rear portion 16. The GFCI also includes an inner housing (not shown) when the cover portion 14 is removed from the rear portion 16. The cover portion 14 and rear portion 16 are removably secured to each other via fastening means such as clips, screws, brackets, tabs and the like. The cover portion includes plugin slots (also known as face receptacles) 18 and 20 and grounding slots 22. It should be appreciated by those skilled in the art that plugin slots 18 and 20 and grounding slots 22 can accommodate polarized, non-polarized, grounded or non-grounded blades of a male plug. The male plug can be a two wire or three wire plug without departing from the scope of the embodiment of the present invention.

The GFCI receptacle 10 further includes mounting strap 24 having mounting holes 26 for mounting the GFCI receptacle 10 to a junction box (not shown). At the rear wall of the housing 12 is a grounding screw 28 for connecting a ground conductor (not shown).

A test button 30 extends through opening 32 in the cover portion 14 of the housing 12. The test button is used to activate a test operation that tests the operation of the circuit interrupting portion disposed in the GFCI receptacle 10. The circuit interrupting portion, to be described in more detail below, is used to break electrical continuity in one or more conductive paths between the line and load side of the GFCI receptacle 10. A reset button 34 extends through opening 36 in the cover portion 14 of the housing 12. The reset button 34 is used to activate a reset operation, which reestablishes electrical continuity in the open conductive paths.

Rear portion 16 preferably includes four screws, only two of which are shown in FIG. 1. Load terminal screw 38 is connected to a neutral conductor and an opposing load terminal screw 37 (See FIG. 2) is connected to the hot conductor. Line terminal screw 40 is connected to the neutral conductor and an opposing line terminal screw 39 (See FIG. 2) is connected to the hot conductor. It should be appreciated by those skilled in the art that the GFCI receptacle 10 can also include apertures proximate the line and load terminal screws 37, 38, 39 and 40 to receive the bare end of conductors rather than connecting the bare end of the wires to the line and load terminal screws.

Alarm indicator 44 preferably comprises a dual color lamp which provides a first color when a first filament is activated and a second color when a second filament is activated. The alarm indicator 44A can illuminate to provide a green color when the GFCI receptacle 10 is operating normally and providing GFCI protection. Alternatively, the alarm indicator 44B illuminates to provide a flashing red color when the GFCI receptacle 10 is operating as a normal receptacle and not providing ground fault protection indicating a detected fault in the GFCI mechanism or electronics. Specifically, alarm indicator 44B flashes when any portion of the self test fails or fails a coil test. In another alternate configuration, alarm indicator 44B can illuminate steady to indicate that a ground fault was detected. It should be appreciated by those skilled in the art that although the alarm indicator is described as being a dual filament lamp, two separate single filament lamps, a single lamp having a single filament, or a buzzer, or any other suitable indicator such as a colored lamp can be used to provide an alarm indication without departing from the scope of the present invention.

Figure 2A:
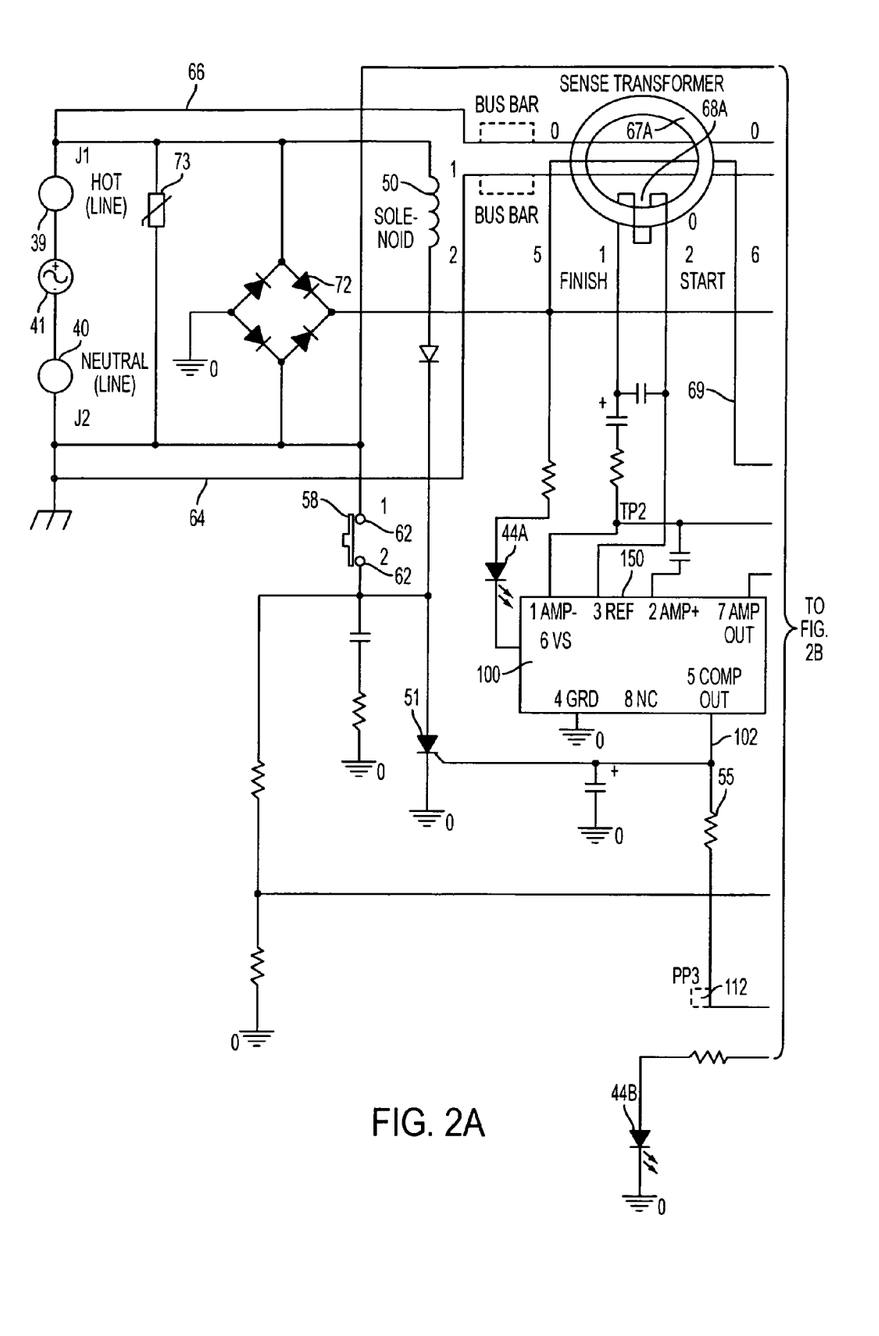
FIG. 2 is a schematic diagram of a ground fault circuit interrupter in accordance with an exemplary embodiment of the present invention, in which a conventional GFCI chip is employed in combination with a microprocessor to operate the GFCI.
Figure 2B:
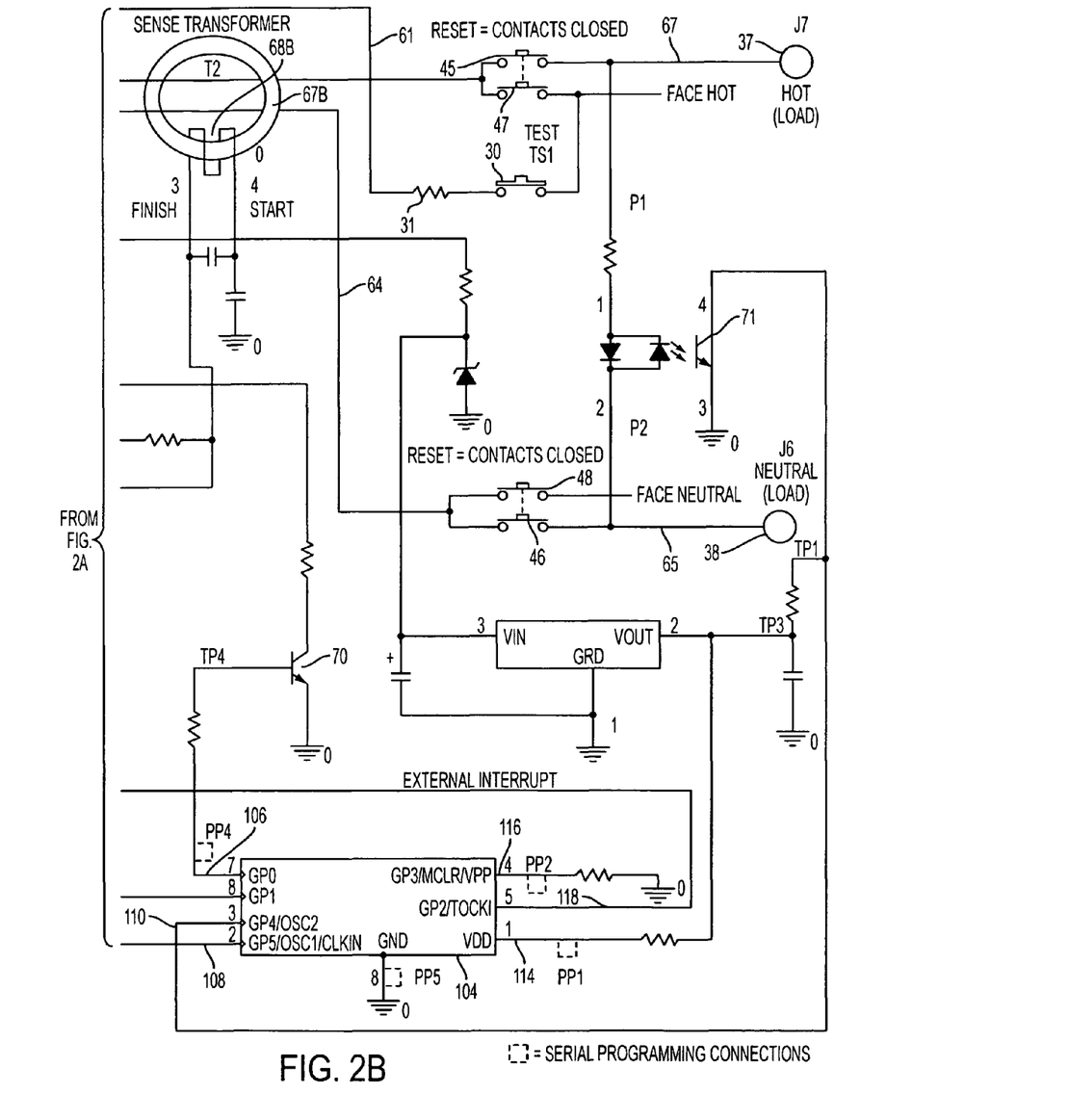
Figure 3:
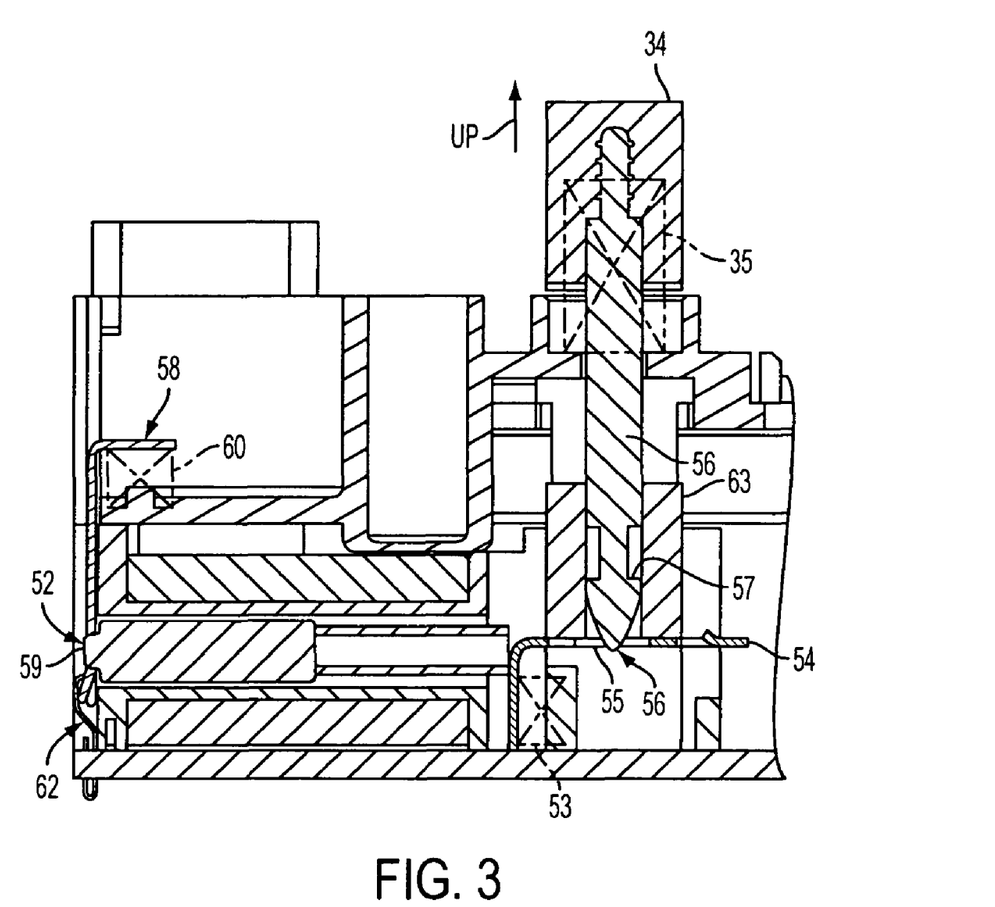
FIG. 3 is a cross sectional view illustrating an example of the positions of the miswire plate, a latching plate and a reset pin of the ground fault circuit interrupting device of FIG. 1 in accordance with an exemplary embodiment of the present invention.

FIG. 2 is a schematic diagram illustrating an example of the circuitry of the ground fault circuit interrupting device of FIG. 1 in accordance with an embodiment of the present invention. In accordance with this embodiment, the GFCI device 10 is provided with a contacts 45, 46, 47, 48, a sensing circuit comprising a GFCI chip 100 and a transformer arrangement comprising sensing transformer 68A and ground transformer 68B, solenoid 50, and a microprocessor 104. With reference to FIG. 3, the GFCI device 10 further comprises a solenoid plunger 52, latching plate 54, reset pin 56, miswire plate 58 and locking spring 60.

GFCI device 10 is structured and arranged to prevent an initial miswiring of the GFCI. That is, as described in more detail below, prior to shipping the device for use, the miswire plate 58 is pressed downward to engage a projection 53 on the back of plunger 52 and makes contact with secondary contacts 62 to thus close the secondary contacts 62. In the GFCI device's initial configuration, the reset pin 56, when depressed, cannot engage the latching plate 54 because the latching plate 54 is displaced by the solenoid plunger 52 and the miswire plate 58, such that aperture 55 is aligned with reset pin 56. When the GFCI receptacle 10 is connected to the line side, the secondary contacts power the solenoid 50, causing solenoid plunger 52 to release miswire plate 58 and position latching plate 54 so that the reset pin 56 can engage with the edge of the latching plate 54 when the reset button 34 is depressed.

FIG. 3 is a cross-sectional view illustrating an example of positions of the miswire plate 58, a latching plate 54 and a reset pin 56 in accordance with an embodiment of the present invention. In FIG. 3, the miswire plate 58 is shown as being engaged with the projection 53 of the plunger 52 via the aperture 59. The miswire plate 58 makes contact with secondary contacts 62, thus closing them. Locking spring 60 is compressed and exerts pressure against the miswire plate 58, but cannot move miswire plate 58 upwards because miswire plate 58 is held in place by projection 53 of solenoid plunger 52. In addition, latching plate 54 is positioned to prevent the reset pin 56 from engaging with the latching plate 54. That is, the latching plate 54 is positioned to allow the reset pin 56 to freely pass through the latching plate 54 when the reset button is depressed without engaging with the latching plate 54.

After power is applied to the line side of the device, the secondary contacts 62 are closed, thus power is applied to the solenoid 50, which drives the plunger 52 forward. This releases the projection 53 of the plunger 52 from the aperture 59 of the miswire plate 58, and also pushes the plunger 52 against the latching plate 54 to position the aperture 55 slightly out of alignment with the reset pin 56. The locking spring 60 urges the miswire plate 58 upward, thus forcing the miswire plate 58 into an extended or non-contacting position. The secondary contacts 62 open and remove power from the solenoid 50.

GFCI receptacle 10 can have the miswire plate 58 in a non-engaged state and the latching plate 54 in an engagement position. Specifically, solenoid plunger 52 can move in an outwardly lateral direction. That is, the latch spring 53 pushes latch plate 54 and solenoid plunger 52 in the lateral direction.

Because the solenoid plunger 52 can move further, latching plate 54 can move to an engagement position, such that reset pin 56 engages an edge of aperture 55 in the latching plate 54 when depressed. The GFCI receptacle is now able to provide ground fault protection.

Referring now to FIG. 2 and the operation of the GFCI receptacle 10 in a ground fault state, FIG. 2 is a schematic diagram of a ground fault circuit interrupter in accordance with an embodiment of the present invention, in which a conventional GFCI chip 100 is employed in combination with a microprocessor 104 to operate the GFCI receptacle 10. The GFCI receptacle 10 employs a GFCI chip 100 with an output 102 connected to a pin 112 of the microprocessor 104. The microprocessor 104 is preferably a Type PIC12F629 or PIC12F675 microprocessor manufactured by Microchip, located in Chandler, Ariz.

The GFCI device 10 employs two sets of contacts, namely contacts primary hot and neutral contacts 45 and 46 and face hot and neutral contacts 47 and 48. Contact 45 establishes electrical continuity between line terminal 39 and load terminal 37 via hot conductor 66. Contact 46 establishes electrical continuity between line terminal 40 and load terminal 38 via neutral conductor 65. Face contacts 47 and 48 establish electrical continuity between the line terminals 39 and 40 and face terminals 18 and 20 via hot conductor 66 and neutral conductor 64, respectively. The isolation of face contacts 47 and 48 from the load terminals 37 and 38 prevent the face terminals 18 and 20 from being powered if the GFCI device 10 is mistakenly wired so that power source 41 is connected to the load terminals 37 and 38. It should be noted that GFCI device 10 is structured and arranged to permit the electronics of the circuit to be powered only when the GFCI device 10 is wired from the line terminals 39 and 40 via a power source. If a power source 41 is connected to the load terminals 37 and 38, the electronics of the GFCI device 10 cannot be powered, and the miswire plate 58 cannot be released in order to close contacts 45, 46, 47 and 48, which are mechanically closed by the reset button 34. Before initial power is applied contacts 45, 46, 47 and 48 are open. The microprocessor 104 detects an output from the optocoupler 71 only when contacts 45 and 46 are closed, which can only occur after the GFCI device has been properly connected on the line side (that is, after the miswire plate 58 has been closed).

The detection of a ground fault condition at a load, which is connected to one of the face receptacles 18, 20 or to the load terminals 37 and 38, is implemented by a current sense transformer 68A, and the GFCI chip 100 as well as other interconnecting components. The GFCI chip 100 is preferably a Type RV4145AM integrated circuit available from Fairchild Semiconductor, located in South Portland, Me. The GFCI chip 100 and the microprocessor 104 are powered from the line terminals 39 and 40 by a full-wave bridge rectifier 72. A transient voltage suppressor 73 is preferably connected across the line terminals 39 and 40 to provide protection from voltage surges due to lightning and other transient conditions. As the transients increase, the voltage suppressor 73 absorbs energy.

Within the GFCI receptacle 10, the hot conductors 66 and 67, as mentioned above, connect the line terminal 39 to the load line terminal 37, and neutral conductors 64 and 65 connect the line terminal 40 to the load terminal 38, in a conventional manner when contacts 45 and 46 are closed. The conductors 66 and 64 pass through the magnetic cores 67A and 67B of the two transformers 68A and 68B, respectively. The transformer 68A serves as a differential sense transformer for detecting a leakage path between the line side of the AC load and an earth ground (not shown), while the transformer 68B serves as a grounded neutral transformer for detecting a leakage path between the neutral side of the AC load and an earth ground. In the absence of a ground fault, the current flowing through the conductors 64 and 66 are equal and opposite, and no net flux is generated in the core 67A of the differential sense transformer 68A. In the event that a connection occurs between the line side of the AC load and ground, however, the current flowing through the conductors 64 and 66 no longer precisely cancel, and a net flux is generated in the core 67A of the differential sense transformer 68A. This flux gives rise to a potential at the output of the sense transformer 68A, and this output is applied to the input 150 of the GFCI chip 100 to produce a trip signal on the output line 102. The trip signal pulses the SCR's 51 gate, and is also detected via pin 112 of the microprocessor 104. The solenoid 50 is energized via the conducting SCR 51, which opens primary hot contact 45 and neutral contact 46 and face hot contact 47 and face neutral contact 48. Specifically, when the solenoid 50 is energized, the solenoid 50 moves the plunger 52 which moves the latching plate 54, thus, freeing the reset pin 56 and opening the contacts 45, 46, 47 and 48. The optocoupler 71 outputs a signal which is detected by the microprocessor 104 via pin 110. If the optocoupler's 71 signal is high, it indicates that primary hot contact 45 and primary neutral contact 46 are open. If the optocoupler's 71 signal is low, it indicates that both the primary hot contact 45 and primary neutral contact 46 are closed Primary hot contact 45 and neutral contact 46 and face hot contact 47 and face neutral contact 48 are in a closed state when the reset button 34 has been pressed and the solenoid 50 is deenergized. This state will be referred to as the normal state or closed state. However, after the solenoid 101 has been energized, the contacts 45, 46, 47 and 48 open. This state will be referred to as an open state.

In operation, a ground fault can occur via a manual or self-test, or an actual ground fault, for example when a person comes into contact with the line side of the AC load and an earth ground at the same time. In a manual test, a user presses test button 30. Test button 30 is connected between the hot conductor 66 and neutral conductor 64, which is a path that bypasses sense transformer 68A and ground transformer 68B. When the test button 30 is pressed, an imbalance is detected by sense transformer 68A because a path is established outside of the transformers 68A and 68B. Since there is no canceling current in the opposite direction, sense transformer 68A detects the current imbalance. As discussed above, the GFCI chip 100 detects a fault condition via transformers 68A and 68B. GFCI chip 100 communicates the fault condition via a trip signal on pin 102 to the microprocessor 104 via pin 112. Since the microprocessor 104 has no way of knowing whether a ground fault was triggered by an actual fault or by a manual fault simulated by pressing test button 30, the microprocessor 104 always reacts as if an actual fault condition has occurred.

The microprocessor 104 also does not know whether the actual fault has been removed until a user presses the reset button 34. If the fault is still present, the transformers 68A and 68B will detect the condition and GFCI chip 100 will reopen the contacts immediately as discussed above. If a manual test was performed, the fault will no longer be present and the GFCI device 10 returns to normal operation.

As described in the above-referenced application Ser. No. 11/531,000, a self test is preferably performed on the fault detection and circuit tripping portions of the GFCI device 10. In this example, the self test is preferably performed in two stages, Test A and Test B, and preferably at 1 minute intervals. However, as will be appreciated by one skilled in the art, the microprocessor 104 can be programmed to perform testing at any interval of time. A continuity test is included with Test A. The continuity test is first performed on the solenoid 50. Specifically, during a positive half cycle of a sinusoid, the solenoid 50 conducts and charges capacitor C5. During the negative half cycle of the sinusoid, the capacitor C5 discharges. The discharge of capacitor C5 is detected by the microprocessor 104 via pin 118. If there is no discharge on capacitor C5, it indicates that the solenoid 50 is defective because the solenoid 50 did not allow capacitor C5 to charge. Thus, for the continuity test, the continuity of the solenoid is tested via the discharge of capacitor C5.

During Test A, the microprocessor 104 communicates a signal, which is preferably less than 2.0 ms to the transistor 70 via pin 106 on a negative half sinusoid near the middle of the half sinusoid. The transistor 70 is activated and provides a signal on conductor 69, which creates an imbalance in sensing transformer 68A. The imbalance is detected by GFCI chip 100, and the GFCI chip 100 provides a 0.5 ms trip signal on pin 102 that is detected by the microprocessor 104 via pin 112. Pin 112 of the microprocessor 104 is preferably an analog I/O. Resistor R5, which is in series with the pin 112 of the microprocessor 104, allows capacitor C2 to be monitored. Specifically, when the signal is output from pin 102 of the GFCI chip 100, the charge on capacitor C2 increases. The test signal is preferably short and completed during a negative half cycle of a sinusoid to prevent current in the sinusoid 50 and thereby avoid tripping the contacts 45, 46, 47 and 48. The microprocessor 104 detects the GFCI chip's trip signal in order to verify that the GFCI chip 100 is operating normally. It should be appreciated by those skilled in the art that the embodiment of the present invention can be practiced without the continuity test for Test A.

It should be noted that in an embodiment of the present invention, the I/O of microprocessor 104 preferably comprises a 10 bit I/O providing 3.2 my per bit accuracy or 31 bits for 0.1 v. The sampling rate of the microprocessor 104 is ≈15 μs at an internal oscillator frequency of 4 MHz (8 $T_{OSC}$) and 15 μs×31 bits=0.46 ms. The 2.5 k ohm minimum recommended analog source requirement is met since capacitor C2 has a low source resistance (ESR) and is charged by GFCI chip 100.

It should be noted that during Test A, if the GFCI chip 100 cannot provide an output signal to open the contacts 45, 46, 47 and 48, the microprocessor 104 will activate SCR 51 and energize the solenoid 50 to open the contacts 45, 46, 47 and 48. The user can reset the GFCI device 10 to restore power to the load terminals. However, the microprocessor 104 will no longer send a signal to open the contacts 45, 46, 47 and 48.

The second phase of self testing is referred to herein as Test B. Test B tests the operability of SCR 51 and includes the test for the continuity of solenoid 50 via pin 118 of the microprocessor 104. Specifically, during a positive half cycle of a sinusoid, the solenoid 50 conducts and charges capacitor C5. During the negative half cycle of the sinusoid, the capacitor C5 discharges. The discharge of capacitor C5 is detected by the microprocessor 104 via pin 118. If there is no discharge on capacitor C5, it indicates that the solenoid 50 is defective because the solenoid 50 did not allow capacitor C5 to charge. Thus, for the continuity test, the continuity of the solenoid is tested via the discharge of capacitor C5. Next, the capacitor C2 is quick charged via a 0.5 ms pulse on pin 112 of the microprocessor 104. The 0.5 ms pulse is asserted high 12 ms after the zero crossing at the start of the positive half sinusoid. That is, Test B is preferably initiated only on the negative half sinusoid. The charge on capacitor C2 activates SCR 51 about 0.4 ms from the zero crossing, which is far away from the energy necessary to open contacts 45, 46, 47 and 48. The microprocessor 104 will then detect via pin 118 whether capacitor C5 discharges through the SCR 51 in order to determine if the SCR 51 is operating normally. It should be appreciated by those skilled in the art that the embodiment of the present invention can be practiced without the continuity test for Test B.

The GFCI device 10 determines that the one minute periodic test failed, the one minute test can be repeated, preferably eight times, and if the test fails each time, the GFCI device 10 can be declared as non-operational. As previously described, the red LED 44B will flash. The GFCI device 10 allows a user to reset the GFCI device 10 to function in an unprotected receptacle mode, if the GFCI device 10 is determined to be non-operational. The red LED 44B will then flash to indicate that the GFCI device 10 is not providing ground fault protection.

It should be noted that if the GFCI device 10 is determined to be nonfunctional, and operates in a receptacle mode of operation, the self tests are prevented from occurring. The microprocessor 104 flashes the red LED 44B via pin 108.

The power/alarm indicator 44 will now be described. It should be noted that the GFCI chip 100 preferably includes a regulator 126 that provides a dual function. The regulator can be, but is not limited to, a low dropout regulator (LDO) such as MCP1700 available from Microchip located in Chandler, Ariz. One function is to power the internal circuitry of the GFCI chip 100. The second function is to power circuitry external to the GFCI chip 100 (such as Green LED 44A and microprocessor 104). The green LED 44A illuminates during normal operation of the GFCI receptacle 10. The red LED 44B is illuminated solid if contacts 45, 46, 47 and 48 have been tripped and the green LED 44A is extinguished. However, the red LED 44B flashes to indicate that the GFCI receptacle 10 is not providing ground fault protection if any of the self tests have failed.

Figure 4:
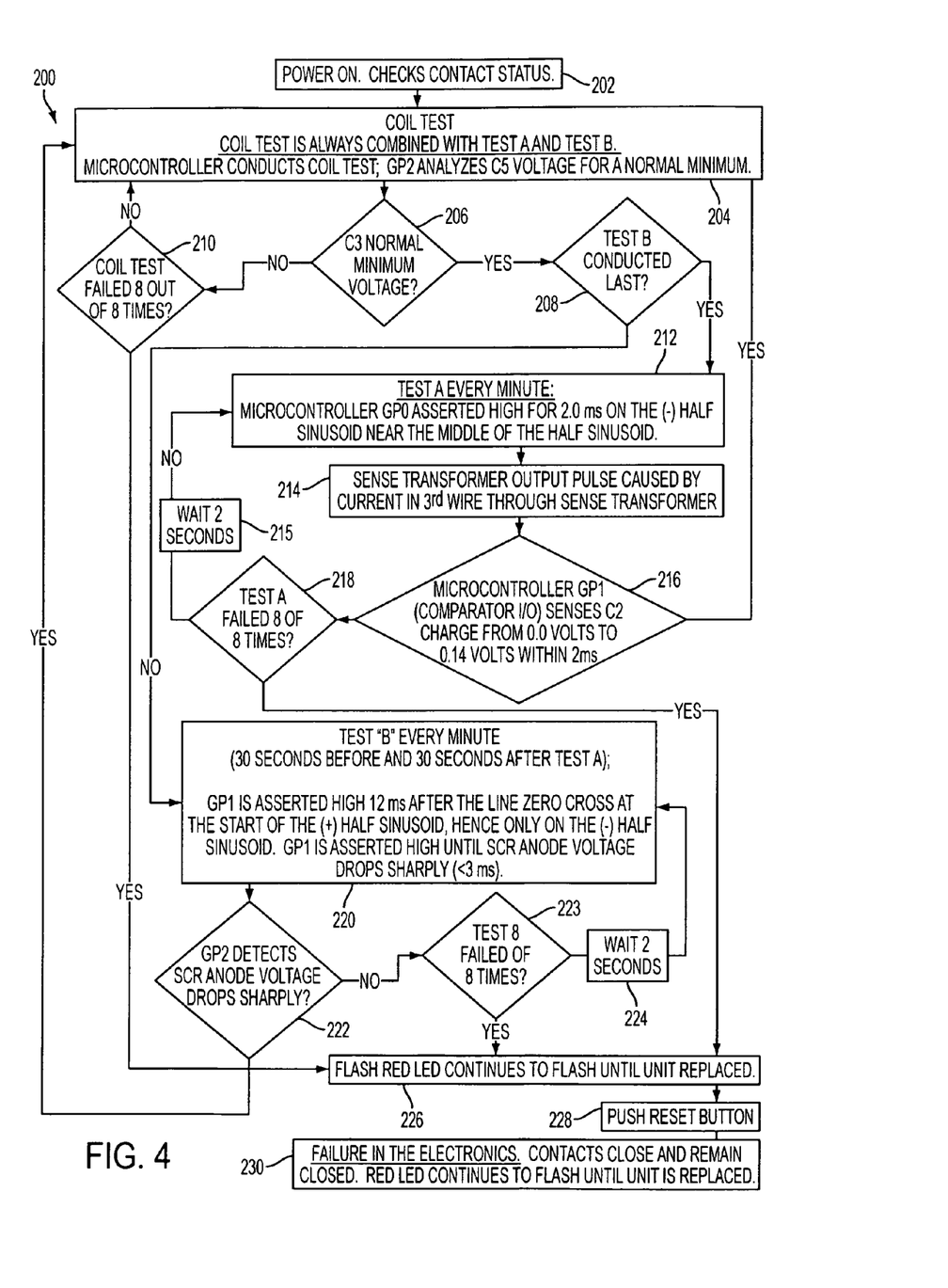
FIG. 4 is a flow chart of an example of a method of performing an automatic self test on the GFCI in accordance with an exemplary embodiment of the present invention.

FIG. 4 is a flow chart of an example of a method of performing an automatic self test on the GFCI in accordance with an embodiment of the present invention. The method 200 is initiated at step 202 where the GFCI receptacle 10 is powered on and the status of the primary hot and neutral contacts 45 and 46 is determined via pin 110 of the microprocessor 104. At step 204, a decision is made to initiate a self test. The self test is preferably performed in two stages or tests. Test A comprises testing sense transformer 68A and GFCI circuit 100. Test B comprises testing the SCR 51. An exemplary automatic self test is preferably performed once per minute. The self test preferably tests the solenoid 50 before each of Test A and Test B. However, it should be appreciated by those skilled in the art that a self test can be scheduled at any interval of time without departing from the scope of the present invention.

At step 206, a determination is made as to whether C5 is at a normal minimum voltage which indicates that solenoid 50 has continuity. Specifically, during a positive half cycle of a sinusoid, the solenoid 50 conducts and charges capacitor C5. During the negative half cycle of the sinusoid, the capacitor C5 discharges. The discharge of capacitor C5 is detected by the microprocessor 104 via pin 118. If there is no discharge on capacitor C5, it indicates that the solenoid 50 is defective because the solenoid 50 did not allow capacitor C5 to charge.

If the determination at step 206 is answered negatively, the method proceeds to step 210 where a determination is made as to whether the solenoid test failed 8 out of 8 times. If the determination at step 210 is answered affirmatively, the method proceeds to step 226. If the determination at step 210 is answered negatively, the method returns to step 204.

If the determination at step 206 is answered affirmatively, the method proceeds to step 208 where a determination is made as to whether Test B was conducted last. If test B was not conducted last, the method proceeds to step 220. If Test B was conducted last, the method proceeds to step 212 to perform Test A.

At step 212, Test A is performed. The microcontroller 104 is asserted high at pin 106 for about 1.5 ms near the middle of a negative half sinusoid of the line input 39, and preferably less than about 2.0 ms. The high signal on pin 106 turns transistor 70 on resulting in a signal on third wire 69. It should be noted that the SCR 51 anode capacitor C5 waveform is used to locate positive and negative half sinusoids and the middle of half sinusoids. Capacitor C5 voltage minimum occurs slightly after the true zero crossing during the negative half cycle. The microcontroller 104 preferably monitors the voltage of C5 via pin 118, and may include software to calculate the actual zero crossing.

At step 214, the sense transformer 68A detects the pulse on third wire 69 as an imbalance and provides an imbalance indication to the GFCI chip 100. The GFCI chip 100 places a trip signal on pin 102 of the GFCI chip 100 which charges capacitor C2.

At step 216, a determination is made as to whether the microcontroller 104 detects capacitor C2 being charged from 0.0 volts to preferably 0.14 volts. The rise in capacitor C2 occurs preferably within 2 ms. If the determination at step 216, is answered affirmatively, the method returns to step 204.

If the determination at step 216 is answered negatively, the process proceeds to step 218 where a determination is made as to whether Test A, which tests the sense transformer 68A and GFCI chip 100, has failed 8 out of 8 times.

If the determination at step 218 is answered negatively, the process waits for 2 seconds at step 219 then returns to step 212. If the determination at step 218 is answered affirmatively, the process proceeds to step 226.

At step 220, Test B is performed every minute preferably 30 seconds before and 30 seconds after Test A is performed. The microcontroller 104 places a high signal on pin 112 of the microcontroller 104 after the zero crossing at the end of the positive half sinusoid, hence only on the negative half sinusoid. Pin 112 is maintained high until the SCR anode voltage drops sharply after 2 ms but no longer than 3 ms. When SCR 51 is conducting capacitor C5 can discharge rapidly through SCR 51 rather than through R15 and R16 which is a slow discharge. The method proceeds to step 222.

At step 222 a determination is made as to whether the microcontroller 104 detects a sharp drop in the SCR anode voltage at pin 118. That is the microcontroller 104 looks for the SCR anode voltage to drop sharply to ground. Test B is performed during the negative half cycle when the solenoid 50 advantageously cannot be tripped.

If the determination at step 222 is answered affirmatively, Test B has passed and the method returns to step 204. If the determination at step 222 is answered negatively, the process proceeds to step 224 where a determination is made as to whether Test "B" has failed 8 out of 8 times. If Test B has failed eight times, the method proceeds to step 226.

At step 226, the microcontroller 104 flashes the red LED 42B permanently via pin 108 if Test "A" or "B" failed 8 out of 8 times. The flashing of the red LED 42B provides an alarm indication to a user that GFCI 10 is nonfunctional and has reached its End Of Life (EOL). If Test "A" fails and the failure of the GFCI 10 prevents the GFCI chip 100 from providing an output on pin 102 to open the contacts, the microcontroller 104 provides a signal to activate SCR 51 and open the primary hot and neutral contacts 45 and 46. It should be noted that the user is not permanently locked-out. The user is still able to reset GFCI 10 to restore power. However, the microcontroller 104 will no longer conduct self tests, and will not generate another signal to open the primary hot and neutral contacts 45 and 46. Manual tests, however, remain available to the user.

At step 228, the reset button 34 is pressed in order to reset the primary hot and neutral contacts 45 and 46 of the GFCI 10. At step 230, the red LED 42B continues to flash if the primary hot and neutral contacts 45 and 46 remain closed. The malfunctioning GFCI 10 should be replaced.

As stated above, when ground fault (GF) current levels vary around the GFCI GF current threshold, intermittent GFCI chip 100 outputs can occur. These intermittent outputs may have sufficient energy to turn the SCR 51 on and, at the same time, result in insufficient energy in the solenoid coil 50 to open the contacts 45, 46, 47 and 48. Thus, it is possible for the microprocessor 104 to make a false EOL determination. When the GFCI chip 100 output signal occurs at a random time (i.e., not during the typical 8 millisecond duration of a self test), then the microprocessor 104 uses this information to differentiate this signal from a GFCI chip 100 output signal produced by the internal self test function described above in connection with FIG. 4. If the mechanics of the GFCI device 10 are not working (e.g., the contacts 45, 46, 47 and 48), the optocoupler 71 will not provide a "contacts open" signal to the microprocessor 104.

Figure 5:
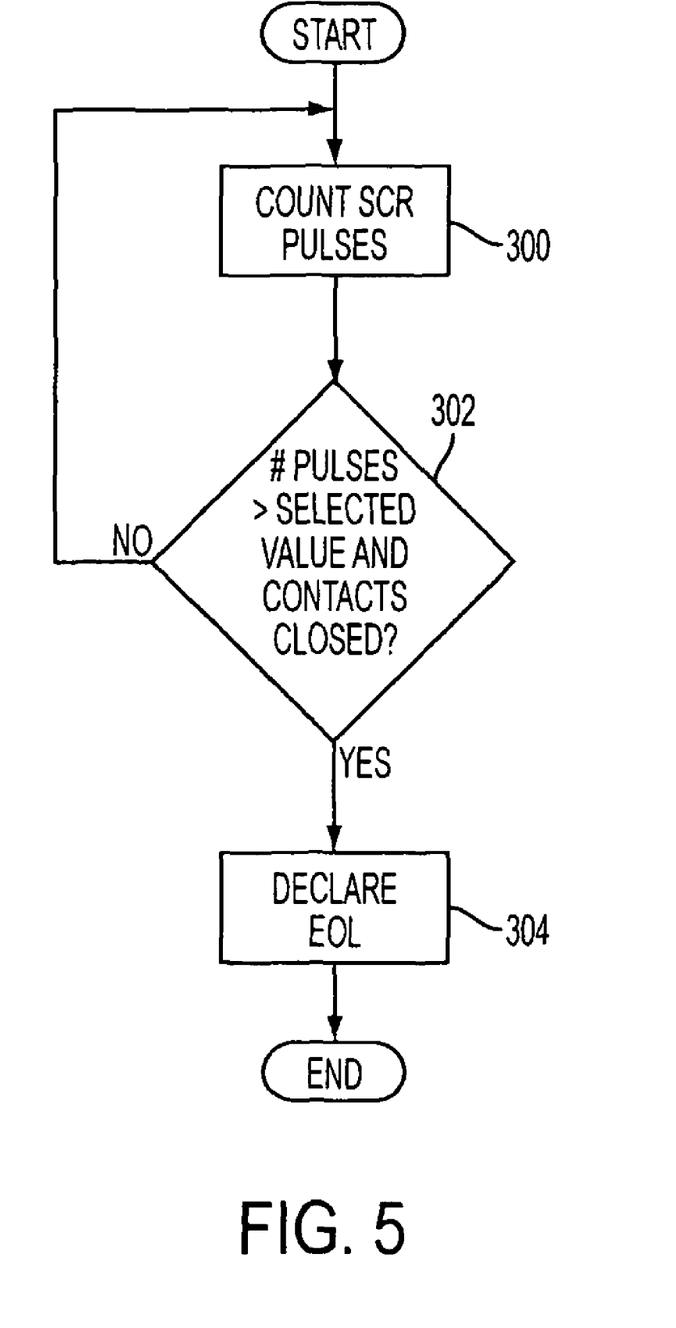
FIG. 5 is a flow chart of an example of a method of determining EOL of the GFCI in accordance with an exemplary embodiment of the present invention.

With reference to FIG. 5, for GF current levels above the GFCI device 10 GF current threshold, the GFCI chip 100 output signal will produce SCR gating or turn on signals on each successive positive half sinusoid that are hereinafter referred to as pulses (block 300). In accordance with the present invention, the microprocessor 104 is preferably programmed to count the SCR pulses (block 302). When the microprocessor 104 counts a selected number of consecutive SCR 51 turn on signals (e.g., 10 consecutive SCR turn on signals) and the contacts 45, 46, 47 and 48 remain closed (block 304), the microprocessor is programmed to declare the EOL of the GFCI device 10 and flash the red LED 44B preferably permanently (e.g., store the EOL status and LED 44B state in permanent microprocessor memory) as indicated in block 306. Thus, this method prevents a false EOL determination from being caused by intermittent GFCI chip 100 output signals that may or may not produce sufficient solenoid coil power to trip the latching plate 54 and open the contacts 45, 46, 47 and 48 (see negative branch of block 304).

The microprocessor 104 can also be programmed to monitor the SCR 51 anode and count pulses at the SCR anode (e.g., monitor the leading edges of the sinusoid pulses whereby the gate voltage turns on and then drops to 0 volts) in block 302 of FIG. 5. As ground leakage increases, intermittent pulses from the GFCI chip 100 become more common. If the pulses occur on the negative half sinusoid, the microprocessor 104 may declare a false EOL. Thus, the microprocessor 104 is programmed to count the pulses on the positive half sinusoid only. As with the above-described operation involving monitoring of the SCR 51 gate, the selected number of consecutive pulses that need to be counted while the contacts remain closed to declare EOL can be predetermined and can be any one of a plurality of integer values.

In accordance with yet another embodiment of the present invention, the microprocessor 104 can be programmed to monitor both the SCR 51 anode and gate outputs and count corresponding pulses in the determination of EOL in block 302 of FOG. 5. The microprocessor 104 can be programmed to require a selected number of pulses (i.e., on the positive half sinusoid) at both the SCR 51 anode and gate to be counted while the contacts are closed before declaring EOL.

Alternatively, the microprocessor 104 can be programmed to require a selected number of pulses (i.e., on the positive half sinusoid) at either the SCR 51 anode or gate to be counted while the contacts are closed before declaring EOL. Further, the microprocessor 104 can be programmed to require a selected number of pulses (i.e., on the positive half sinusoid) to occur at one of the SCR 51 anode or gate before the other, while the contacts remain closed, before declaring EOL.

The present invention can also be embodied as computer-readable codes on a computer-readable recording medium. The computer-readable recording medium is any data storage device that can store data which can thereafter be read by a computer system. Examples of the computer-readable recording medium include, but are not limited to, read-only memory (ROM), random-access memory (RAM), CD-ROMs, magnetic tapes, floppy disks, optical data storage devices, and carrier waves (such as data transmission through the Internet via wired or wireless transmission paths). The computer-readable recording medium can also be distributed over network-coupled computer systems so that the computer-readable code is stored and executed in a distributed fashion. Also, functional programs, codes, and code segments for accomplishing the present invention can be easily construed as within the scope of the invention by programmers skilled in the art to which the present invention pertains.

Those skilled in the art can now appreciate from the foregoing description that the broad teachings of the present invention can be implemented in a variety of forms. Therefore, while this invention can be described in connection with particular examples thereof, the true scope of the invention should not be so limited since other modifications will become apparent to the skilled practitioner upon a study of the drawings, specification and following claims.

What is claimed is:

1. A ground fault circuit interrupter (GFCI) device comprising:
   a GFCI chip generating a fault detection signal upon detecting a fault;
   a circuit interruption device for opening contacts to remove power from a load based on the fault detection signal;
   a contacts monitoring device for generating an output signal indicating whether the contacts are closed;
   a switching device electrically connected to said GFCI chip and switching to an on state upon receiving the fault detection signal;
   a processing device receiving the fault detection signal from the GFCI chip and the output signal from the contacts monitoring device, the processing device being programmed to declare an end of life (EOL) condition when the output signal indicates that the contacts remained closed at the same time the fault detection signal has occurred a predetermined number of times.

2. A GFCI device as claimed in claim 1, wherein the processing device is programmed to defer determining whether the EOL condition is met until after a self-test procedure is completed.

3. A fault detector comprising:
   line side terminals for receiving an input power signal;
   load side terminals for connecting to a load;
   hot and neutral conductors for connecting respective line side terminals to corresponding load side terminals through a switching device;
   a ground fault circuit interrupter (GFCI) device for detecting faults and generating a gate signal upon detection of a fault;
   a gated semiconductor device operable to conduct current and turn on in response to receiving the gate signal; and
   a processing device receiving the gate signal from said GFCI device and programmed to declare end of life of the fault detector when the gate signal occurs a plurality of times while the switching device remains closed.

4. A fault detector as claimed in claim 3, wherein the gate signal from said GFCI device comprises a pulse when the fault is detected and said processing device is programmed to count the pulses to determine if a predetermined number of pulses occurred while the switching device remained closed.

5. A fault detector as claimed in claim 3, wherein the gated semiconductor device is a silicon-controlled rectifier (SCR) that produces output pulses corresponding to the gate signal
   the processing device monitors the output pulses of the SCR to determine whether the gate signal has occurred and determines the EOL condition based on the output pulses of the SCR and whether or not the switching device remained closed.

6. A fault detector as claimed in claim 5, wherein the output pulses of the SCR are counted during the positive half-cycle of an AC power signal provided to the fault detector.

7. A fault detector as claimed in claim 3, wherein the GFCI device has a ground fault current threshold and generates intermittent signals that have sufficient energy to turn on the gated semiconductor device and insufficient energy to activate the switching device and an output signal of said gated semiconductor device comprises pulses corresponding to when the intermittent signals turn on the gated semiconductor device.

8. A method for operating a ground fault circuit interrupter (GFCI) comprising:
   performing a self-test procedure including automatically generating a flux at a fault sensor;
   receiving one or more fault detection signal indicating that a fault has been detected, wherein the detected faults include one or more of test faults generated by the self-test procedure, actual faults and intermittent signals not corresponding to either test faults or actual faults;
   receiving an input signal indicating when contacts used to interrupt power to a load are closed;
   determining a fault detection signal to be false if the contacts remain closed after the fault detection signal is received; and
   declaring end of life (EOL) when a predetermined number of fault detection signals are determined to be false.

9. A method as claimed in claim 8, further comprising deferring the determination of whether the fault detection signals are false until after the self-test procedure is performed.

10. A method as claimed in claim 8, wherein the intermittent signals comprise output signals from a GFCI chip generated when ground fault current levels in the GFCI chip exceed a ground fault current threshold for the GFCI chip.

11. A method as claimed in claim 10, wherein the GFCI chip generates gate device turn on signals on each positive half sinusoid of a power signal that correspond to pulses, the determining step comprising counting the pulses when the contacts are closed and declaring EOL when a selected number of the pulses is counted.

12. A method as claimed in claim 11, wherein the gated device is a silicon-controlled rectifier (SCR) and a processing device is programmed to count pulses at the anode of the SCR, the determining step comprising counting pulses at both a gate of the SCR and the anode of the SCR.

13. A method as claimed in claim 12, wherein the determining step comprises counting a selected number of the pulses at both the anode and the gate of the SCR before declaring EOL.

14. A method as claimed in claim 12, wherein the determining step comprises counting a selected number of pulses at either one of the anode and the gate of the SCR before declaring EOL.

15. A method as claimed in claim 12, wherein the determining step comprises counting a selected number of pulses at one or more of the anode and the gate of the SCR before EOL is declared.

16. A non-transitory computer-readable medium having embodied thereon programmed code for executing a method of operating a ground fault circuit interrupter (GFCI), the method comprising:
- receiving one or more of fault detection signals indicating when faults are detected and intermittent signals that have sufficient energy to turn on a gated semiconductor device and insufficient energy to activate a switching device;
- receiving input signals indicating when contacts used to interrupt power to a load are closed; and
- declaring end of life (EOL) when a predetermined number of intermittent signals are received and the contacts are closed.

17. A computer-readable medium as claimed in claim 16, further comprising deferring the declaring EOL while the GFCI is undergoing a self-test until after the self-test is performed.

18. A computer-readable medium as claimed in claim 16, wherein a GFCI chip generates gated device turn on signals on each positive half sinusoid of a power signal that correspond to pulses and further comprising counting the pulses when the contacts are closed and declaring EOL when a selected number of the pulses is counted.

19. A computer-readable medium as claimed in claim 18, wherein the gated device is a silicon-controlled rectifier (SCR) and a processing device is programmed to count pulses at the anode of the SCR, the counting step comprising counting pulses at both a gate of the SCR and the anode of the SCR.

20. A computer-readable medium as claimed in claim 19, wherein the counting step comprises counting a selected number of the pulses at both the anode and the gate of the SCR before declaring EOL.

21. A computer-readable medium as claimed in claim 19, wherein the counting step comprises counting a selected number of pulses at either one of the anode and the gate of the SCR before declaring EOL.

22. A computer-readable medium as claimed in claim 19, wherein the counting step comprises counting a selected number of pulses at one or more of the anode and the gate of the SCR before EOL is declared.

23. A ground fault circuit interrupter (GFCI) device comprising:
- a fault detection circuit operable to detect faults;
- a circuit interrupting device having a plurality of contacts that open to remove power from a load;
- a contacts monitor operable to generate an output signal indicative of whether the contacts of said circuit interrupting device are open or closed;
- a processing device configured to receive input signals from said fault detection circuit and said contacts monitor and operable to determine whether the GFCI device is functioning properly, wherein said processing device makes such determination based on the input signals from said fault detection circuit and said contacts monitor and while the contacts of said circuit interrupting device remain closed;
- a hot conductive path electrically connecting a hot line terminal to a hot load terminal when the contacts of said circuit interrupting device are closed;
- a neutral conductive path electrically connecting a neutral line terminal to a neutral load terminal when the contacts of said circuit interrupting device are closed;
- a test fault conductive path electrically connecting said fault detection circuit and said processing device when the GFCI device is in a self-test mode, wherein said test fault conductive path is independent from said hot and neutral conductive paths; and
- a ground fault sensing device operable to detect real and test ground faults, wherein said hot conductive path, said neutral conductive path and said test fault conductive path each pass through said ground fault sensing device.

24. A ground fault circuit interrupter (GFCI) device comprising:
- a GFCI chip for detecting faults;
- a circuit interruption device for opening contacts to remove power from a load upon fault detection;
- a contacts monitoring device generating a contacts status signal indicating if the contacts are closed;
- a drive device electrically connected to and operably controlled by the GFCI chip to drive the circuit interruption device to open the contacts when the GFCI chip provides said drive device with a drive signal;
- a processing device electrically connected to said GFCI chip, said contacts monitoring device and said drive device, wherein said processing device determines that the GFCI device has reached its end-of-life (EOL) when said GFCI chip generates a predetermined number of intermittent pulses with sufficient energy to drive said drive device into an on state but with insufficient energy to activate said circuit interruption device to open the contacts.

25. A ground fault circuit interrupter as recited in claim 24, wherein said processing device monitors the contact status signal and the intermittent pulses and determines EOL when the contacts status signal indicates the contacts remain closed during the time period the predetermined number of intermittent pulses were generated.

26. A ground fault circuit interrupter as recited in claim 24, wherein said processing device provides a drive signal to said drive device when EOL is determined.

* * * * *